United States Patent [19]

Flanagan

[11] 4,439,501
[45] Mar. 27, 1984

[54] CHARGE-RETENTION STORAGE BATTERY

[76] Inventor: Hugh L. Flanagan, 22 Randolph St., Canton, Mass. 02021

[21] Appl. No.: 416,081

[22] Filed: Sep. 8, 1982

[51] Int. Cl.³ .................... H01M 2/38; H01M 6/38
[52] U.S. Cl. .................................. 429/70; 429/113
[58] Field of Search ............... 429/61, 63, 72, 70, 429/67, 110, 113, 118

[56] References Cited

U.S. PATENT DOCUMENTS

| | | | |
|---|---|---|---|
| 750,250 | 1/1904 | Bryan | 429/113 |
| 851,353 | 4/1907 | Hite | 429/70 |
| 944,079 | 12/1909 | Decker | 429/70 |
| 4,288,501 | 9/1981 | Moody | 429/113 |

*Primary Examiner*—Donald L. Walton

[57] ABSTRACT

An electric storage battery is provided wherein the electrolyte is transferred under pressure of an inert gas to a reservoir for containment during periods of non-use of the battery. The inert gas also serves to blanket the battery electrodes during such non-use periods, preventing oxidation while not exposed to electrolyte. Thus, there is no discharge of the battery during even prolonged periods of non-use and on return of the electrolyte to the battery cells the battery is in ready condition for use at relatively full charge.

6 Claims, 2 Drawing Figures

CHARGE-RETENTION STORAGE BATTERY

BACKGROUND OF THE INVENTION (a) Field of the Invention

This invention relates to an electric storage battery, and its manner of construction and use, and, in particular, to such a battery that can retain a charge during prolonged periods of non-use.

(b) Description of the Prior Art

Storage batteries of various constructions have long been used in a wide variety of applications for providing direct current, as needed. One common application is the providing of current for starting an automobile. Another is for the starting of various boat motors. In recent years, those concerned with providing solar-powered or wind-powered electrical systems have relied on storage batteries for electricity when the sun or wind is available only spasmodically.

When used in such applications, e.g., in the starting of the automobile, the storage battery discharges, i.e., it uses up a certain amount of its stored charge, in starting the car. Once the car has been started, however, its operation restores the battery to full charge. The battery also discharges during periods of non-use, i.e., when the car is not being operated. Ordinarily this presents no problem, as an automobile's battery is intermittently, over relatively short time spans, being discharged slightly and brought back to full charge. However, where the period of non-use of a charged storage battery is somewhat prolonged, the battery may discharge to such an extent as to be unable to perform its intended function. Car owners who have gone on vacation and left their car unused for several days have sometimes returned to a car that wouldn't start because of this very problem.

In the case of a car owner, a discharged or weak battery, while a considerable nuisance, is primarily just that, a nuisance. To a boat owner, however, a motor that won't start because of a discharged battery can present an emergency situation.

Heretofore, others have suggested a reservoir for electrolyte storage associated with the battery. In U.S. Pat. No. 851,353 which issued Apr. 23, 1907, Hite discloses a primary battery construction in which electrolyte is normally contained in a separate compartment of the battery, when the battery is not being used. As shown in Hite, the electrolyte storage compartment or reservoir is located below and interconnected with the battery cells so that electrolyte, during periods of non-use, can be discharged and returned to the reservoir by gravity. When the battery is to be next used, air is forced into the electrolyte compartment causing the electrolyte to be forced upwardly through channels in the battery construction to the battery cells. U.S. Pat. No. 944,079 also discloses an electric battery construction wherein electrolyte is forced under pressure from a reservoir therefor upwardly into a battery. As in U.S. Pat. No. 851,353, the electrolyte can be returned to its storage tank by gravity.

Although both U.S. Pat. Nos. 851,353 and 944,079 disclose the concept of maintaining electrolyte in a reservoir associated with the battery, during periods that the battery is not being used, neither patent appreciates the problem confronting me in the making of this invention. Hite (U.S. Pat. No. 851,353), as is apparently Decker (U.S. Pat. No. 944,079), is concerned with a primary battery, not a secondary or storage battery, the concern of my invention.

In U.S. Pat. No. 3,103,452 there is disclosed a delayed-activation battery in which an electrolyte reservoir is located above the battery. However, this electrolyte once introduced into the battery cells is not returned to the reservoir during periods of battery non-use.

SUMMARY OF THE INVENTION

In accordance with the more general aspects of the invention, there is provided an electric storage battery wherein the electrolyte can be stored in a reservoir out of contact with the battery electrodes during periods of non-use, particularly where that period of non-use may be prolonged, and transferred back to the battery cells, when battery use is desired. The electrolyte is caused to be transferred to the reservoir under inert gas pressure, which inert gas blankets the battery electrodes while out of contact with electrolyte, preventing these electrodes from becoming oxidized or otherwise deteriorating. When the battery is to be used, the inert gas pressure is vented, allowing the electrolyte to return to the battery cells by gravity.

Quite advantageously, when the electrolyte is removed from contact with the electrodes, the charged battery retains its charge, even during prolonged periods of non-use. When electrolyte is re-introduced to the battery cells, the electrodes having been blanketed with inert gas, the battery is operable for the intended purposes.

Thus, there is provided in accordance with the basic aspects of the invention an electric storage battery capable of retaining a charge even during prolonged periods of non-use comprising:

(a) an inner casing defined by a planar, horizontally disposed top surface, first and second parallel vertically disposed end walls and parallel first and second vertically disposed side walls whereby to provide a sealed compartment open at the bottom; at least one battery cell being provided within said inner casing for the containment of electrolyte, a positive and negative electrode being spaced apart and provided within each said at least one cell;

(b) an outer casing larger in dimension than said inner casing open at the top, said inner casing being located and supported within said outer casing in such a manner that a passageway is provided for the flow of electrolyte to and from the said inner casing through the said open bottom and between the two casings and the open top of the outer casing;

(c) a reservoir for electrolyte connected to said outer casing and disposed with respect thereto at a location above the outer casing into which the electrolyte is transferred during periods of non-use of the battery;

(d) means connected to the top surface of said inner casing for providing inert gas under pressure to cause the electrolyte to flow out of the battery cells into the reservoir, and inert gas providing in said cells once emptied a blanket for the electrodes for protecting them from oxidation; and (e) means connected to the reservoir for venting the reservoir to the atmosphere whereby once the inert gas pressure is released the electrolyte will flow back under gravity into the battery cells in the said inner casing.

BRIEF DESCRIPTION OF THE DRAWING

The novel features and operation of the present invention will be better understood by reference to the drawings, in conjunction with reading the following specification, in which.

DETAILED DESCRIPTION OF THE INVENTION AND THE PREFERRED EMBODIMENTS

Figure 1:
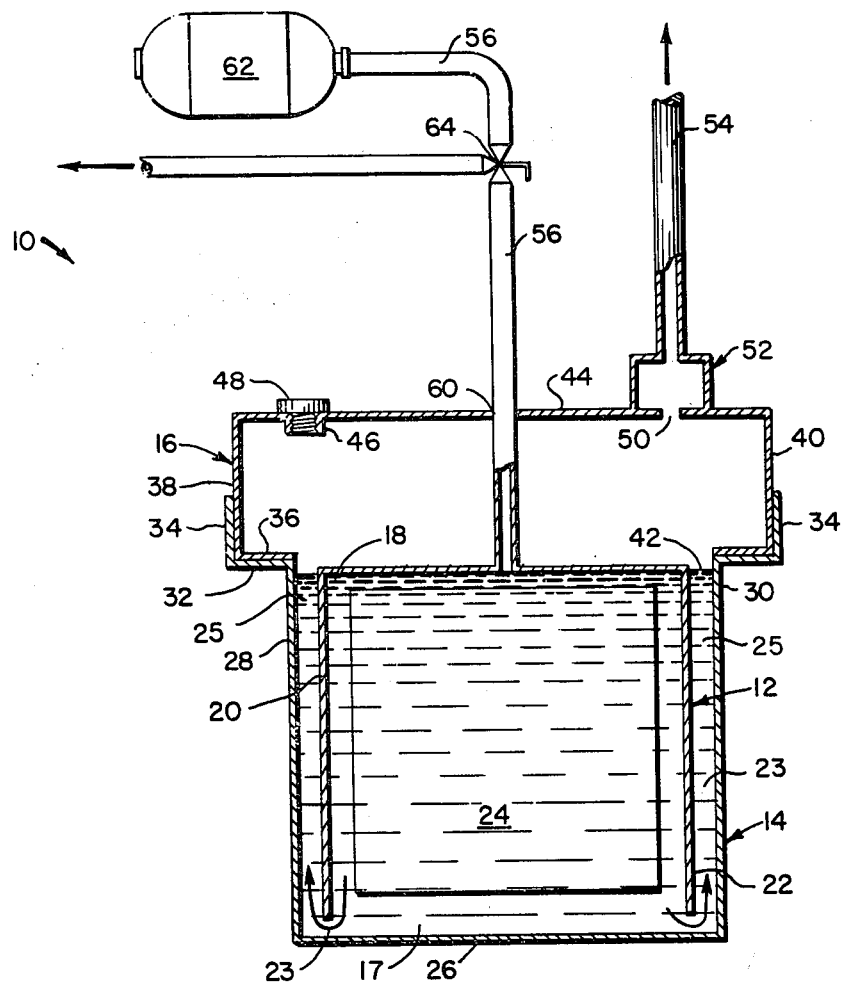
FIG. 1 is a diagrammatic view in cross-section showing one embodiment of a charge-retention storage battery in accordance with the invention.

Turning now to the drawing, there is disclosed in FIG. 1 thereof an electric storage battery 10 in accordance with the invention comprising in combination an inner casing 12, an outer casing 14 and a reservoir 16 for containment of electrolyte 17 when the battery is not being used. Inner casing 12 is defined by planar, horizontally disposed top surface 18, first and second parallel, vertically disposed planar side walls 20, 22 and first and second, planar, parallel, vertically disposed end walls, not shown. Thus, there is provided a sealed casing of cubic shape open at the bottom, in which is provided at least one battery cell according to usual techniques which conventionally includes a positive and negative electrode, the positive electrode being designated in FIG. 1 by reference numeral 24, the negative electrode not being shown.

Inner casing 12 can be of square or rectangular shape, as desired, depending somewhat on the number of battery cells required for any particular battery application. It will be appreciated by those skilled in the battery art that the electrodes can, as can the casing construction, be of any materials conventionally used for storage batteries. However, the so-called "Pb-$H_2SO_4$" batteries are believed most common. With such storage batteries, the electrodes are flat plates of Pb $O_2$ (electro-positive) and Pb (electro-negative), the electrodes in each cell being connected together in some suitable fashion. The terminal electrodes of opposite polarity are, of course, secured by conventional techniques to the usual binding posts (not shown).

Inner casing 12 is located within, and is supported in outer casing 14, of somewhat larger dimension, and which is fully open at the top, as is seen from the drawing. The result is that a passageway 23 (as indicated by the arrows) is provided between the open bottom of inner casing 12 and the horizontally disposed planar bottom 26 of outer casing 14, and the vertically disposed side walls 20, 22 of inner casing 12 and those side walls 28, 30 of outer casing 14, for electrolyte 17, the purpose for which will be hereinafter more fully disclosed, if not already clear. Outer casing 14 terminates at its top surface in horizontally disposed, outwardly extending flange 32. This flange terminates at vertically disposed integral flange 34 which defines the perimeter of the outer casing's top surface.

Flange 32 provides support for electrolyte reservoir 16, the shape of which corresponds to that of outer casing or open topped compartment 14. Reservoir 16, as shown in the drawing, is open at its bottom, the bottom opening being defined by horizontally disposed flange 36 which protrudes inwardly from vertically disposed sides 38, 40 and the ends (not shown) of reservoir 16.

Flange 36 contacts and, as above-disclosed, is supported by flange 32, the sides and ends of reservoir 16 being in sealing contact with vertically disposed flange 34, so as to provide a unitary sealed construction with outer casing 14. As will be seen by reference to FIG. 1 of the drawing, flange 36 terminates at respective side walls 28, 30 whereby to provide a uniformly wide passageway 25 on each side of inner casing 12 for the flow of the electrolyte 17 into reservoir 16.

The top surface 44 of reservoir 16 is provided with threaded opening 46 for filling of the battery, as needed, with electrolyte. This opening, as usual, is provided with a removable threaded plug 48; however, it will be appreciated that press-fitted plugs can be used for this purpose, if desired, and as is conventionally done.

Reservoir 16 is provided in its top surface 44 with elongated slot 50, in association with which is provided elongated vent manifold 52, the purpose for which will be later explained. Connected to vent manifold 52, in its top surface, and centrally thereof, is vent tube 54 which extends vertically upwardly, as shown, to a desired predetermined distance to prevent outflow of electrolyte from reservoir 16.

Centrally of reservoir 16 there is provided gas injector tube or conduit 56 extending vertically upwardly from, and connected at its lower end to, top surface 18 of inner casing 12. This connection, as will be appreciated, will provide a positive seal against escape of gas. A positive seal will likewise be provided where conduit 56 extends through the top 44 of reservoir 16, as indicated by reference numeral 60, to prevent escape of electrolyte.

To the other end of conduit 56 is attached a source 62 of inert gas, e.g., a commercially available tank of nitrogen under suitable pressure. Intermediate the gas source and inner casing 12 is provided valve 64 for controlling the gas pressure to inner casing 12, and for releasing that pressure, as desired.

In practice, storage battery 10, is charged according to usual technique, and located in whatever application intended, e.g., a sail boat. Actually, as will be appreciated the battery may be first located and then charged, as is sometimes the case. Once charged, however, particularly if the battery is not intended to be used for a relatively prolonged period, e.g., for several days at least, valve 64 will be opened, introducing inert gas into the top of inner casing 12, over the top of electrolyte 17. While this pressure is not particularly critical, it should be sufficient to cause electrolyte 17 to be pushed out of the open bottom of inner casing 12, through passageway 23 and up through passageway 25 and into reservoir 16. The pressure will, of course depend somewhat upon the size of battery, inner casing dimensions, dimensions of passageway, reservoir size, etc.; however, it should not be so great as to cause electrolyte to be discharged out vent tube 54. In general, a pressure of about 0.5 lbs./in$^2$. will be found satisfactory. Nevertheless, in the beginning, it may be necessary to determine, by regulation of valve 64, at what pressure electrolyte will be just discharged from the vent tube, and then backing this pressure off slightly. The primary consideration is not, however, that all the electrolyte be transferred into reservoir 16, but that the electrodes in the inner casing 12 be free of electrolyte, thus preventing undesired battery discharge. The size of reservoir 16, nevertheless, should be such as to handle whatever quantity of electrolyte is normally contained in the battery.

Although not shown in the drawing, conduit 56 can discharge into inner casing 12 through a manifold which includes discharge openings corresponding to each battery cell. This will permit better equalization of pressure on the battery cells, making for more uniform removal of the electrolyte. Ordinarily, electrolyte will fill not only the cells within inner casing 12 but will be of sufficient volume to seek its level in the passageway 25.

When the battery is to be placed in operation, valve 64 is controlled to release the inert gas pressure. As the reservoir for the electrolyte is vented to the atmosphere, this will result in electrolyte returning to inner casing 12 by gravity.

Figure 2:
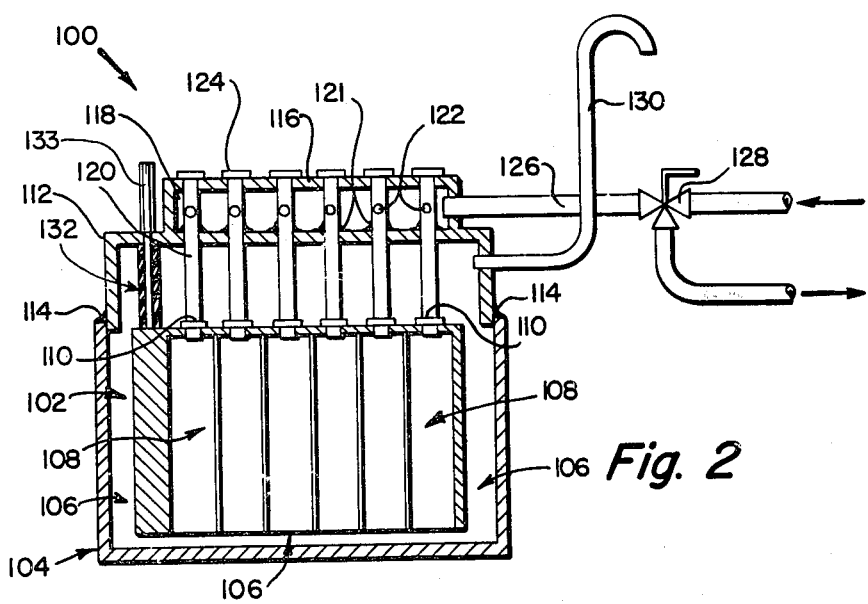
FIG. 2 is a diagrammatic view in cross-section showing another embodiment of a charge-retention storage battery.

Referring now to FIG. 2, there is disclosed a further embodiment of a charge-retention storage battery 100 in accordance with the invention. As shown therein battery 100 comprises an inner casing 102, open at the bottom, located within and supported in outer casing 104, which is open at its top surface. Outer casing 104, like inner casing 102, is of cubic shape but is of somewhat greater over-all dimension so that a passageway 106 is provided at the bottom and along the sides of the inner casing 102, as shown, for the flow of electrolyte. Although, not shown, the four corners of the inner casing 102, at the open bottom can be supported, so long as flow of electrolyte is relatively unimpeded.

Inner casing 102 can be any conventional storage battery which has had its bottom removed, e.g., by cutting, to reveal its internal construction. Or the battery can be so produced during manufacture. The inner casing (or conventional storage battery) 102 can have any number of cells 108 desired, depending on the application for the charge-retention battery 100. The battery shown is a so-called conventional 12-volt battery having six cells, each cell being provided with the usual fill and test port 110.

Connected to outer casing 104 at its open top is reservoir 112 for electrolyte (not shown). As shown reservoir 112 is of slightly lesser over-all dimension than outer casing 104 whereby to fit snugly within and against the inner wall surfaces of the outer casing. Rubber cement or other suitable adhesive material is applied at location 114, to provide not only a positive seal but to join the reservoir and outer casing into unitary construction.

On top of reservoir 112 is provided, rectangular, cubic-shaped pressure chamber 116 in the top surface of which are provided fill and test ports 118, corresponding in number and location to those in the conventional storage battery serving as inner casing 102.

The fill and test ports 118 in the pressure chamber are each connected to respective fill and test ports 110 by extension tubes 120. Where these tubes pass through the top surface of reservoir 112, a sealant is provided, as indicated by reference numeral 121, using conventional materials for this purpose, to prevent inert gas from entering the reservoir or electrolyte from leaking into the pressure chamber. Each extension tube 120 is provided with an opening as indicated by reference numeral 122 for equalization of inert gas pressure to the battery cells. At the end of each extension tube is provided the usual stopper or plug member 124.

Inert gas is provided from a suitable source therefor, such as a portable tank (not shown) through conduit 126 connected to pressure chamber 116. The gas pressure is controlled by means of three-way valve 128, which valve can be manually or electrically operated according to usual techniques. If desired suitable pressure gauges can be provided.

Near the top of reservoir 112, along one side, is provided vent pipe 130 which extends vertically upwardly a predetermined height to prevent discharge of electrolyte. As will be appreciated, the battery posts (one is identified by reference numeral 132) on inner casing 102 will need be extended in length so as to protrude above the top of reservoir 112, providing means for attachment of the usual battery cables from the starting motor, or the like. The portion of the battery posts within reservoir 112, which will be contacted by electrolyte should be coated with suitable insulating material, as should also those portions of the extension tubes. Outer casing 104 and reservoir 112 can be of any material used for the manufacture of batteries. The main requirement, however, is that their inner surfaces, if the materials of construction are not of insulating material, be coated with such a material, to prevent possible short circuiting of the battery, particularly when in an operative mode.

Battery 100 operates in a manner disclosed earlier for charge-retention storage battery 10. After being charged for use with starting a marine engine, the inner casing is pressurized by inert gas introduced through valve 128. This gas enters and fills pressure chamber 116 discharging therefrom through openings 122 provided in extension tubes 120. Thus, the electrolyte in each battery cell 108 in the inner casing is subjected to equal pressure, causing the electrolyte to be pushed out of the inner casing and discharging upwardly into reservoir 112. As long as the gas pressure is maintained, the electrolyte will be maintained in the reservoir and out of contact with the electrodes (not shown) in the inner casing 102. The inert gas pressure may have to be increased slightly from time-to-time, over extended periods of time, to keep the electrolyte in the reservoir, due to the slight solubility of the gas in the electrolyte. Accordingly, the inert gas used should be at most only slightly soluble in the electrolyte. As the inert gas will blanket the electrodes, the electrodes will not be subject to oxidation or other deterioration, leaving the battery fully functional, once the electrolyte is returned to the battery cells.

When the operation of the battery is needed, valve 128 will be operated to shut off the source of inert gas, at the same time venting that existing gas from the inner casing, and pressure chamber, releasing the pressure on the electrolyte. As the reservoir is vented to atmosphere through vent tube 130, the electrolyte will return by gravity to the inner casing 102.

Electrolyte may need be added from time-to-time, this being accomplished in the usual fashion through fill and test ports 118. Although electrolyte being added is not likely to escape through extension tube openings 122, because of their small diameter, this can be further prevented by using a filling tube that extends into the fill and test ports below the opening 122. If desired, each fill and test port 118 can be provided with integral testing means for determining the level of electrolyte in the respective cells 108. One such device can comprise a light weight wire having a float at its lower end. As the level of electrolyte drops, the float will follow that level causing the wire to lower in extension tube 120 beyond a predetermined mark.

It should be understood that the specific embodiments described herein are merely exemplary of the preferred practice of the present invention and that various modifications and changes may be made in the particular embodiments described herein without departing from the spirit and scope of the present invention.

What I claim is:

1. Electric storage battery capable of retaining a charge even during prolonged periods of non-use comprising:
   (a) an inner casing defined by a planar, horizontally disposed top surface, first and second parallel vertically disposed end walls and parallel first and second vertically disposed side walls whereby to provide a sealed compartment open at the bottom; a multiplicity of battery cells being provided within said inner casing for the containment of electrolyte, each said battery cell being provided with spaced apart positive and negative electrodes, and a test and fill port being provided in said top surface for each said battery cell;
   (b) an outer casing of generally cubic shape larger in dimension than said inner casing defined by a planar, horizontally disposed bottom parallel to said horizontally disposed top surface and vertically disposed side and end walls open at its top, said inner casing being located and supported within said outer casing and spaced apart from said bottom and side and end walls of said outer casing in such a manner that a passageway is provided on each side of said inner casing for the flow of electrolyte to and from the battery cells inside of said inner casing through the said open bottom of the inner casing and between the vertical end and side walls of the said inner and outer casings;
   (c) a reservoir for electrolyte defined by a horizontally disposed top surface and vertically disposed sides and ends extending downwardly therefrom, open at its bottom, and connected to said outer casing and disposed with respect thereto at a location above the outer casing into which electrolyte is transferred from said inner casing under pressure of inert gas during periods of non-use of the battery;
   (d) a cubic-shaped pressure chamber defined by a horizontally disposed top surface and connected to said horizontally disposed top surface of said reservoir, and a multiplicity of test and fill ports in said top surface of said pressure chamber corresponding in number to those provided in the inner casing top surface;
   (e) a first conduit means connected to said pressure chamber for connection to an inert gas source and for introduction of inert gas into the said pressure chamber;
   (f) a second conduit means comprising a plurality of tubes each interconnected with said top surface of said pressure chamber and said top surface of said inner casing extending through said reservoir and pressure chamber and terminating in the said test and fill ports; and an opening being provided in each said tube in that portion located within the said pressure chamber whereby inert gas introduced into said pressure chamber can be provided at equal pressure and sufficient pressure to each said battery cell within said inner casing to case said electrolyte to flow out of said inner casing into said reservoir while simultaneously blanketing the exposed electrodes and protecting them against oxidation, and electrolyte can be added to the said battery cells as and when desired; and
   (g) means connected to the said reservoir for venting the reservoir to the atmosphere whereby once the inert gas pressure is released the electrolyte will flow back from the reservoir under gravity into the battery cells in the said inner casing.

2. Electric storage battery capable of retaining a charge even during prolonged periods of non-use according to claim 1 wherein the open top of the outer casing is defined by a horizontally disposed flange, an upwardly extending vertically disposed flange is connected to and defines the outer perimeter of said outer casing, and said reservoir is supported on its bottom by said horizontally disposed flange.

3. Electric storage battery capable of retaining a charge even during prolonged periods of non-use according to claim 1 wherein said inner casing is a conventional storage battery with its bottom removed.

4. Electric storage battery capable of retaining a charge even during prolonged periods of non-use according to claim 1 wherein said vent means connected to the reservoir comprises a vertically disposed tube open to the atmosphere.

5. Electric storage battery capable of retaining a charge even during prolonged periods of non-use according to claim 1 wherein there is further provided an inert gas source connected to said first conduit means whereby inert gas can be provided to the said pressure chamber under pressure.

6. Electric storage battery capable of retaining a charge even during prolonged periods of non-use according to claim 5 wherein valve means are provided in said first conduit means between said pressure chamber and said inert gas source for regulating and releasing the inert gas pressure.

* * * * *